United States Patent
Doskocil et al.

(10) Patent No.: US 12,533,505 B2
(45) Date of Patent: Jan. 27, 2026

(54) NEUROMODULATION APPARATUS

(71) Applicant: STIMVIA S.R.O., Ostrava-Pustkovec (CZ)

(72) Inventors: Lukas Doskocil, Chocen (CZ); Zdenek Krcil, Pardubice (CZ)

(73) Assignee: STIMVIA S.R.O., Ostrava-Pustkovec (CZ)

( * ) Notice: Subject to any disclaimer, the term of this patent is extended or adjusted under 35 U.S.C. 154(b) by 790 days.

(21) Appl. No.: 17/788,612

(22) PCT Filed: Dec. 11, 2020

(86) PCT No.: PCT/EP2020/085795
§ 371 (c)(1),
(2) Date: Jun. 23, 2022

(87) PCT Pub. No.: WO2021/130033
PCT Pub. Date: Jul. 1, 2021

(65) Prior Publication Data
US 2022/0370787 A1 Nov. 24, 2022

(30) Foreign Application Priority Data
Dec. 23, 2019 (EP) .................................... 19219244

(51) Int. Cl.
*A61N 1/04* (2006.01)
*A61N 1/36* (2006.01)

(52) U.S. Cl.
CPC ....... *A61N 1/0456* (2013.01); *A61N 1/36031* (2017.08)

(58) Field of Classification Search
CPC .............. A61N 1/0456; A61N 1/36031; A61N 1/36021; A61N 1/36014; A61N 1/36034
See application file for complete search history.

(56) References Cited

U.S. PATENT DOCUMENTS 11,786,722 B2 * 10/2023 Doskocil .............. A61N 1/0476
607/62
2004/0220645 A1 11/2004 Freed et al.
(Continued)

FOREIGN PATENT DOCUMENTS

| CN | 110114111 A | 8/2019 |
| DE | 3827232 A1 | 11/1989 |

(Continued)

OTHER PUBLICATIONS

Japanese Notice of Reasons for Rejection related to Application No. 2022-538986; reported on May 29, 2023.
(Continued)

*Primary Examiner* — John R Downey
*Assistant Examiner* — Sebastian X Lukjan
(74) *Attorney, Agent, or Firm* — von Briesen & Roper, s.c.

(57) ABSTRACT

A neuromodulation apparatus and method of using the same. The neuromodulation apparatus includes a plurality of electrodes each of the plurality of electrodes having an electrically conductive element applicable to or under a skin of a patient, a pulse generator electrically connected to each of the plurality of electrodes for transmitting electrical pulses to the plurality of electrodes and a control unit coupled to the pulse generator and adapted to measure a resistance and/or a current-voltage characteristic between at least two electrodes of the plurality of electrodes. The control unit is adapted to control a shape of the electric pulses based on the measured resistance and/or current-voltage characteristic.

13 Claims, 6 Drawing Sheets

(56) References Cited

U.S. PATENT DOCUMENTS

| | | | |
|---|---|---|---|
| 2013/0150918 A1* | 6/2013 | Peterson | A61N 1/36146 607/46 |
| 2014/0296934 A1 | 10/2014 | Gozani et al. | |
| 2014/0296935 A1 | 10/2014 | Ferree et al. | |
| 2017/0209694 A1 | 7/2017 | Thompson et al. | |
| 2019/0083784 A1* | 3/2019 | Raghunathan | A61B 5/0531 |

FOREIGN PATENT DOCUMENTS

| | | |
|---|---|---|
| EP | 2496305 B1 | 12/2018 |
| JP | H08508897 A | 9/1996 |
| JP | 2001170190 A | 6/2001 |
| JP | 2006271689 A | 10/2006 |
| JP | 2009539550 A | 11/2009 |
| JP | 2019501003 A | 1/2019 |
| JP | 2019529001 A | 10/2019 |
| RU | 153341 U1 | 7/2015 |
| RU | 170403 U1 | 4/2017 |

OTHER PUBLICATIONS

Russian Office Action related to Application No. 2022118390; reported on Dec. 28, 2022.

Russian Search Report related to Application No. 2022118390; reported on Dec. 15, 2022.

International Search Report related to Application No. PCT/EP2020/085795; reported on Mar. 18, 2021.

Chinese Office Action related to Application No. 202080089053.9; reported on Mar. 28, 2025.

Brazilian Preliminary Office Action related to Application No. BR112022012312-4; reported on Sep. 16, 2025.

\* cited by examiner

NEUROMODULATION APPARATUS

CROSS-REFERENCE TO RELATED APPLICATION

This Application is a 35 USC § 371 US National Stage filing of International Application No, PCT/EP2020/085795 filed on Dec. 11, 2020 which claims priority under the Paris Convention to European Patent Application No. 19219244.1 filed on Dec. 23, 2019.

FIELD OF THE DISCLOSURE

The present disclosure generally relate to an effective neuromodulation. More particularly, the disclosure relates to a neuromodulation apparatus enabling an effective targeting of a neuromodulation signal from a signal generator onto the target nerve.

BACKGROUND OF THE DISCLOSURE

This section provides background information related to the present disclosure which is not necessarily prior art.

Electrical neuromodulation has been used for a treatment of pain, urinary incontinence, mental and other difficulties, as well as for the prevention of vascular disease.

Traditional systems utilize a simple neuromodulation electrodes in the form of a body invasive needle electrodes inserted into the immediate vicinity of the nerve to be stimulated. The need of insertion of the needle electrodes into the immediate vicinity of the nerve is always associated with a risk of an incorrect placement of the electrode and consequent nerve damage or a lower than desired efficiency of the neuromodulation when not placed into the immediate vicinity of the target nerve.

In recent years became known a new non-invasive method utilizing bipolar electrodes made of metal enabling a modulation of a desired nerve. Such electrodes would be placed with their respective ends onto a stimulation point on a patient's skin. The stimulation point is typically determined as being in a proximate expected position based on an experience and human body knowledge. The setting of the intensity of neuromodulation pulses is typically factory pre-set.

Such approach bears a disadvantage of missing the most advantageous neuromodulation position for the electrodes having a significant impact on whole neuromodulation treatment. Additionally, the electrodes may move during neuromodulation further worsening the impact of the neuromodulation treatment.

Furthermore, to compensate for an inaccurate position of the electrodes towards the targeted nerve the intensity setting of the pulses for neuromodulation treatment is set unnecessarily high causing a discomfort to a patient subjected to the neuromodulation treatment.

Therefore, it would be advantageous to have an apparatus that takes into account at least some of the issues discussed above as well as possibly other issues.

SUMMARY OF THE DISCLOSURE

One objective of the present disclosure is to remedy at least part of these drawbacks. An aspect of the resent disclosure is directed to a neuromodulation apparatus. The neuromodulation apparatus includes a plurality of electrodes each of the plurality of electrodes having an electrically conductive element applicable to or under a skin of a patient, a pulse generator electrically connected to each of the plurality of electrodes for transmitting electrical pulses to the plurality of electrodes and a control unit coupled to the pulse generator and adapted to measure a resistance and/or a current-voltage characteristic between at least two electrodes of the plurality of electrodes. The control unit is adapted to control a shape of the electric pulses based on the measured resistance and/or current-voltage characteristic.

In another aspect, the neuromodulation apparatus further comprises at least one detector configured to detect a response of the patient's body to at least one pulse generated by the pulse generator, wherein the detector is further adapted to provide feedback on the detected response to the control unit.

In another aspect, the at least one detector is configured to detect a change in an electrical activity produced by muscles as a response to the at least one pulse generated by the pulse generator.

In another aspect, the at least one detector is at least one electromyography (EMG) sensor.

In another aspect, the at least one detector is at least one motion detector configured to detect a movement of the patient's body and adapted to provide feedback on the movement to the control unit. The movement of the patient's body is in response to the at least one pulse of the pulse generator.

In another aspect, the at least one motion detector includes at least one of an accelerometer, an electrical field sensor, a camera, an optical sensor, an infrared sensor, a capacitive sensor, an inductive sensor, an ultrasound sensor or magnetic sensor.

In another aspect, at least one of the plurality of electrodes is applicable to a proximity of at least one peripheral nerve of the patient's body.

In another aspect, at least one of the plurality of electrodes is applicable to a limb and the detected movement of the patient is a movement of the limb.

In another aspect, the plurality of electrodes comprise a first electrode applicable to a back of a knee of a first leg of the patient and a second electrode applicable to a back of a knee of a second leg of the patient.

In another aspect, the plurality of electrodes comprise a first electrode applicable to proximity of an ankle of a leg of the patient.

In another aspect, the plurality of electrodes comprise a first electrode applicable to proximity of cavernous nerve of the patient.

In another aspect, at least one of the plurality of electrodes are applicable to a throat of the patient and the detected movement of the patient is a movement of at least one face muscle of the patient.

In another aspect, the plurality of electrodes comprise a first electrode applicable to proximity of an ankle of a first leg of the patient and a second electrode applicable to proximity of an ankle of a second leg of the patient.

In another aspect, the plurality of electrodes further comprise a grounding electrode applicable to or under a skin of the patient.

In another aspect, the plurality of electrodes further comprise a grounding electrode applicable to a skin of an abdomen of the patient.

In another aspect, the plurality of electrodes further comprise a grounding electrode applicable to a lower back of the patient in proximity of sacral plexus nerve.

In another aspect, the control unit is configured to provide a feedback for an electrode positional guidance towards a predetermined nerve as at least one electrode is being moved or re-positioned on the patient skin and the feedback provided is based on changes of resistance and/or current-voltage characteristic between at least two electrodes of the plurality of electrode.

In another aspect, the feedback is provided as at least one of a sound, a picture or sequence of pictures, or a physiological response.

In another aspect, the control unit is configured to control a slope of rising edge of the electric pulses and/or a magnitude of the electric pulses.

In another aspect, the control unit is further configured to control a pulse period and/or a pulse width of the electric pulses.

In another aspect, the control unit is configured to periodically measure the resistance and/or the current-voltage characteristic.

In another aspect, the control unit is configured to dynamically control an internal resistance of the pulse generator based on the periodical measurement of the resistance and/or the current-voltage characteristic.

In another aspect, the plurality of electrodes are formed by at least one matrix of electrodes comprising a plurality of electrically conductive elements electrically isolated from each other and each of the electrically conductive elements are applicable to the skin of the patient;

A further aspect is directed to a method of using the neuromodulation apparatus as defined above. The method includes: applying the plurality of the electrodes to or under a skin of a patient, wherein at least one electrode of the plurality of the electrodes is positioned in the probable location of a target nerve to be modulated; initiating a calibration mode and calibrating an initial position by a measurement of a resistance and/or a current-voltage characteristic between the plurality of electrodes; moving or re-positioning the at least one electrode of the plurality of electrodes applied to the skin of the patient whilst periodically measuring and recording a resistance and/or current-voltage characteristic between the plurality of electrodes; determining variations within the recorded resistance and/or current-voltage characteristic.

In a further aspect, the method includes providing a feedback guiding to an optimum position between the at least one of the plurality of electrodes and the target nerve to be modulated based on the variations.

In a further aspect, the method includes generating an audible sound or displaying a picture to provide guiding feedback for the optimum position of the at least one of the plurality of electrodes.

In a further aspect, the method includes determining an initial profile of a pulse for neuromodulation based on the measured resistance and/or current-voltage characteristic.

In a further aspect, the method includes generating at least one pulse by a pulse generator connected to each of the plurality of electrodes.

In a further aspect, the method includes detecting a response of the patient's body to the at least one pulse generated by the pulse generator.

In a further aspect, the method includes setting frequency and/or magnitude of the electric pulses.

Further areas of applicability will become apparent from the description herein. The description and specific examples in the summary are intended for purposes of illustration only and are not intended to limit the scope of the present disclosure.

A further aspect is directed to a method of using the neuromodulation apparatus as defined above for a medical treatment of at least one of overactive bladder, migraine, erectile dysfunction, spermatogenesis disorders or a benign prostatic hyperplasia.

In a further aspect, the method for the medical treatment includes: applying the plurality of the electrodes to or under a skin of a patient, wherein at least one electrode of the plurality of the electrodes is positioned in the probable location of a target nerve to be modulated and generating pulses by a pulse generator connected to each of the plurality of electrodes.

In a further aspect, the method for the medical treatment includes: applying the at least one electrode of the plurality of the electrodes to or under a skin of a patient, wherein the at least one electrode is positioned in the probable location of at least one of sciatic, pudendal, peroneal, cavernous, sacral plexus or a tibial nerve.

In a further aspect, the method for the medical treatment includes: applying the at least one electrode of the plurality of the electrodes is positioned in the probable location of a lumbosacral plexus, common peroneal, superior gluteal, inferior gluteal, posterior cutaneous femoral, obturator internus, piriformis, quadratus femoris, plantar or coccygeal nerve.

In a further aspect, the method for the medical treatment can be used in conjunction with, or as a part of, the method of using the neuromodulation apparatus as defined above.

BRIEF DESCRIPTION OF THE DRAWINGS

Other features and advantages of the invention appear from the following detailed description of some of its embodiments, given by way of non-limiting example, and with reference to the accompanying drawings, in which.

DETAILED DESCRIPTION OF THE DISCLOSURE

Figure 1:
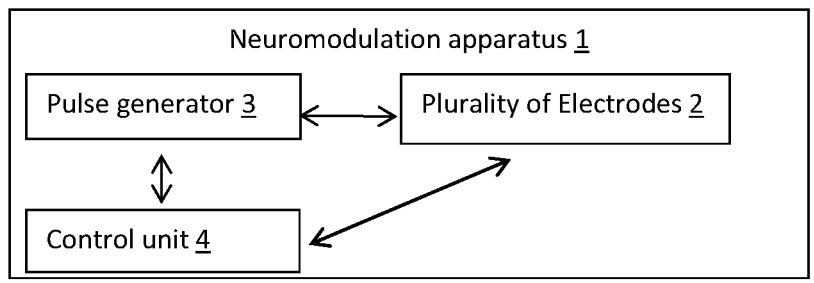
FIG. 1 is a block diagram depicting an embodiment of a neuromodulation apparatus.

The foregoing summary, as well as the following detailed description of certain examples will be better understood when read in conjunction with the appended drawings. As used herein, an element or step recited in the singular and proceeded with the word "a" or "an" should be understood as not excluding plural of the elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

In the figures, the same references denote identical or similar elements, unless stated otherwise. In the drawings, the size of each element or a specific portion constituting the element is exaggerated, omitted, or schematically shown for convenience and clarity of description. Thus, the size of each component may not entirely reflect the actual size. In the case where it is judged that the detailed description of the related known functions or constructions may unnecessarily obscure the gist of the present disclosure, such explanation will be omitted.

FIG. 1 depicts a block diagram of an exemplary embodiment of a neuromodulation apparatus 1. The embodiment comprises plurality of electrodes 2 a pulse generator 3 and a control unit 4.

Figure 7:
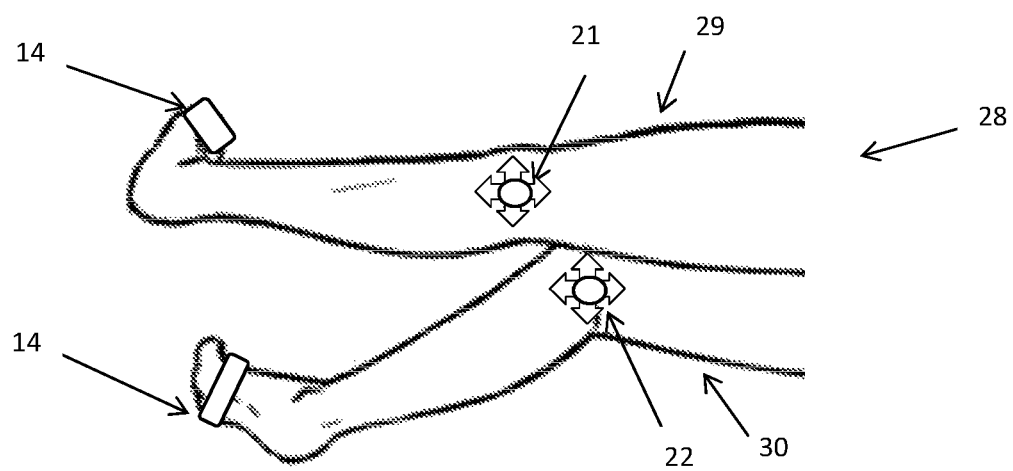
FIG. 7 is an exemplary illustration of electrodes positioning on the patient.
Figure 8:
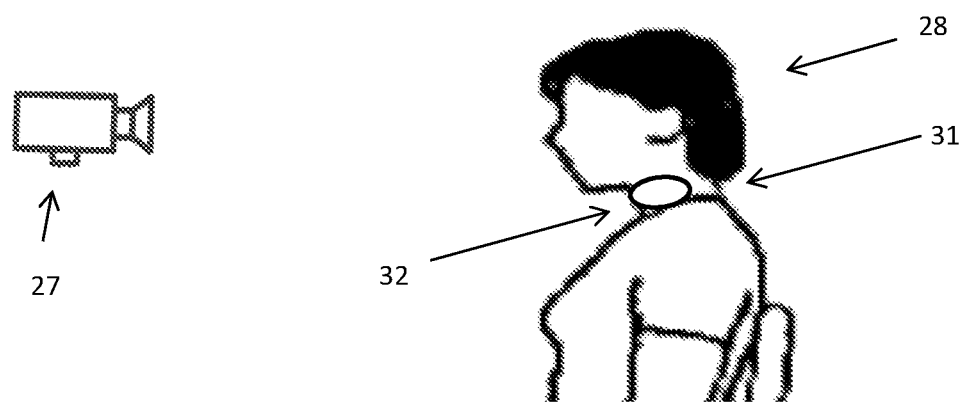
FIG. 8 is another exemplary illustration of electrodes placement on the patient.
Figure 9:
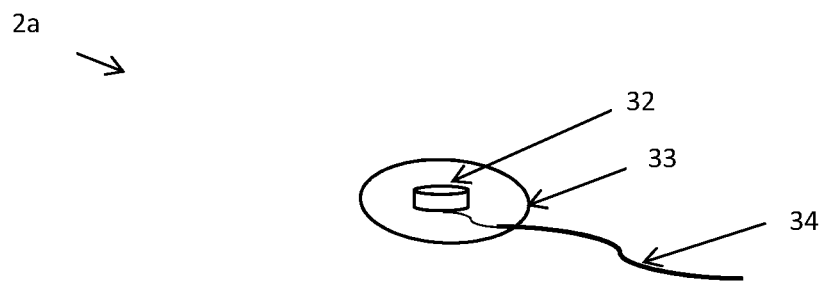
FIG. 9 is an exemplary illustration of an electrode.

As shown for example in FIG. 9, each electrode 2a of the plurality of electrodes 2 may have an electrically conductive element 32 applicable to a skin of a patient 28 (visible for instance in FIGS. 5 to 8).

The pulse generator 3 may be electrically connected to each electrode 2a of the plurality of electrodes 2 for transmitting electric pulses to the plurality of electrodes 2. The control unit 4 may be coupled to the pulse generator 3 and adapted to measure a resistance 16 and/or a current-voltage characteristic 17 between at least two electrodes of the plurality of electrodes 2a (see FIG. 3).

The control unit 4 may be adapted to control a shape of the electric pulses based on the measured resistance and/or current-voltage characteristic.

Figure 4:
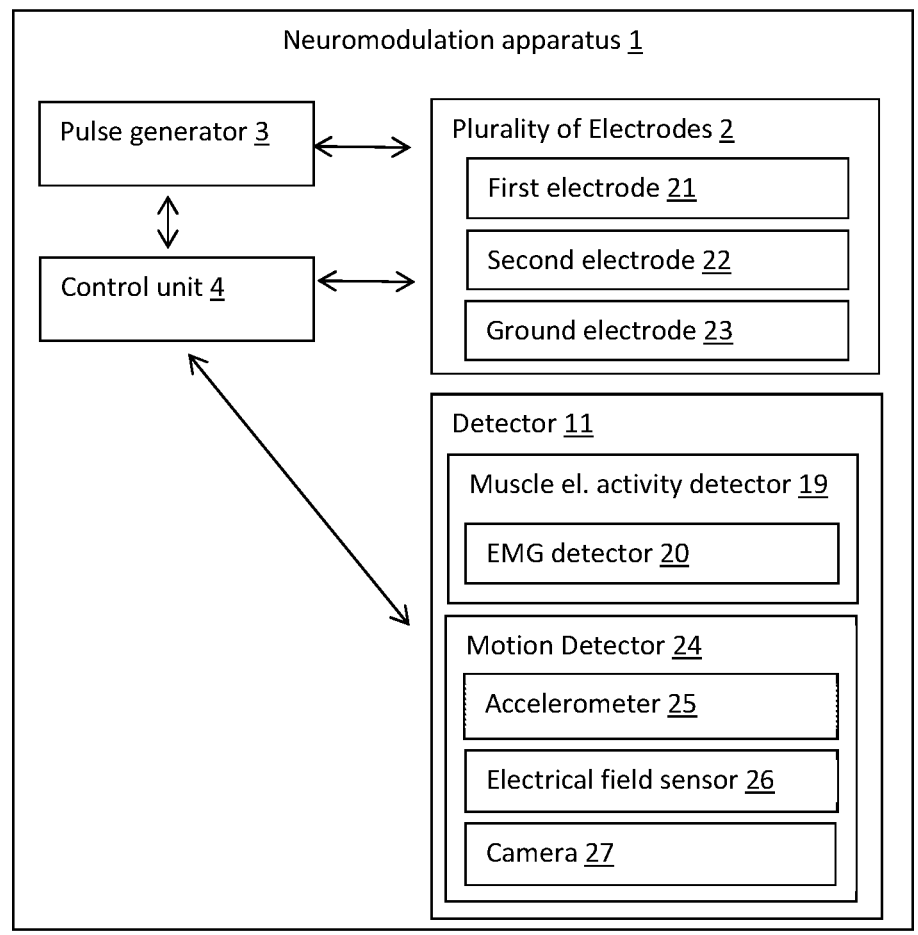
FIG. 4 is a block diagram depicting another embodiment of the neuromodulation apparatus.

Preferably, the plurality of electrodes 2, 2a comprises at least one grounding electrode 23 (see e.g. FIG. 4) and at least one active electrode. The at least one active electrode may be a first and/or second electrode 21, 22 as depicted in FIG. 4.

Advantageously, each of the at least one active electrode 21, 22 as depicted on FIG. 9 may be a separate electrode that comprises a conductive element 32, an electrically non-conductive material 35 and a cable 34. The cable 34 may be adapted to electrically connect the conductive element 32 with the pulse generator 3 and/or control unit 4.

Figure 10:
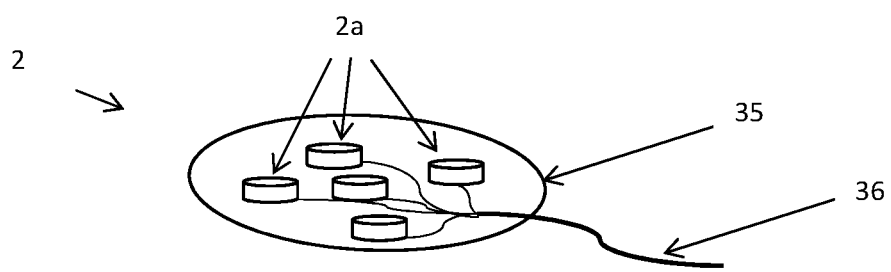
FIG. 10 is an exemplary illustration of a matrix of electrodes.

Advantageously, the plurality 2 of electrodes 2a may be formed by at least one matrix of electrodes as depicted on FIG. 10. Then, each of the at least one matrix electrode comprises a plurality of electrically conductive elements 32 electrically isolated from each other. Each of the electrically conductive elements 32 of the at least one matrix of electrodes may be applicable to the skin of the patient 28 as exemplary shown in FIGS. 5 to 8. Preferably each of the at least one matrix of electrodes 2 further comprises an electrically non-conductive material 35 to which the plurality of electrically conductive elements 32 are coupled. The plurality of the conductive elements 32 may also be embedded in the electrically non-conductive material. The electrically non-conductive material may have any suitable shape for specific electrode placement to enable the electrode placement on the patient 28 body. The shape of separate 2a electrode or a matrix of electrodes 2 may include of frustoconical, oval, curvy or a flat shape. The electrically conductive elements 32 may be placed in proximity to each other. The electrically non-conductive material 35 may provide a support and/or retaining means for the electrically conductive elements ensuring that the electrically conductive elements 32 are kept in place and being electrically isolated from each other. Preferably each of the at least one matrix of electrodes 2 further comprises a cable 36 adapted to electrically connect the conductive elements 32 with the pulse generator and/or control unit.

Figure 2:
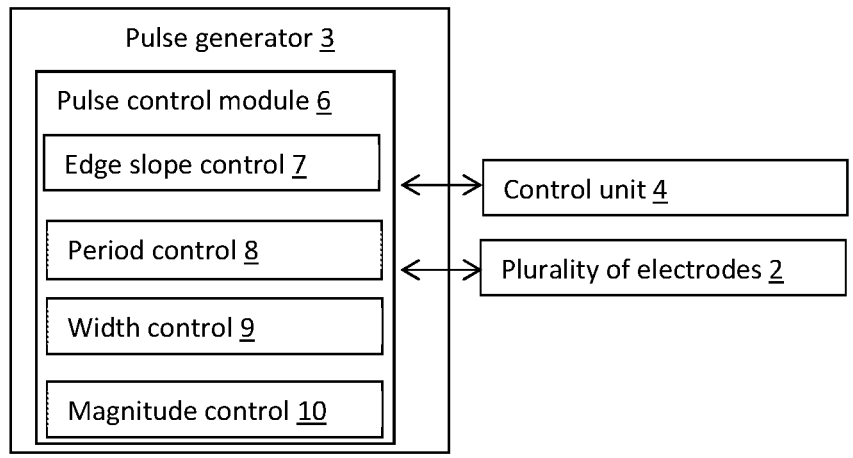
FIG. 2 is a block diagram depicting an embodiment of a pulse generator.

FIG. 2 depicts a block diagram of an embodiment of the pulse generator 3. The pulse generator 3 may be controlled by the control unit 4 or the pulse generator may be controlled directly. Preferably, the pulse generator 3 comprises a pulse control module 6 connected with the control unit 4. The connection between the pulse control module 6 and the control unit 4 may be wired connection for instance via a cable or a wireless connection. Preferably, the pulse control module 6 is further connected with the plurality of electrodes 2, 2a. The connection between the pulse control module 6 and the plurality of electrodes 2, 2a may be wired connection for instance via a cable or a wireless connection. The pulse control module 6 may comprise an edge slope control module 7 configured to enable control the slope of an edge of a pulse generated by the pulse generator. The controlled edge may be the raising edge 40 and/or the falling edge of the pulse. The pulse control module 6 may further comprise a period control module 8 configured to enable control of a generated pulse period 37. The pulse control module 6 may further comprise a width control module 9 configured to enable control of a generated pulse width 39. The width control module 9 may enable pulse width modulation of the pulse. The pulse control module 6 may further comprise a magnitude control module 10 configured to enable control of a generated pulse magnitude 38.

Figure 3:
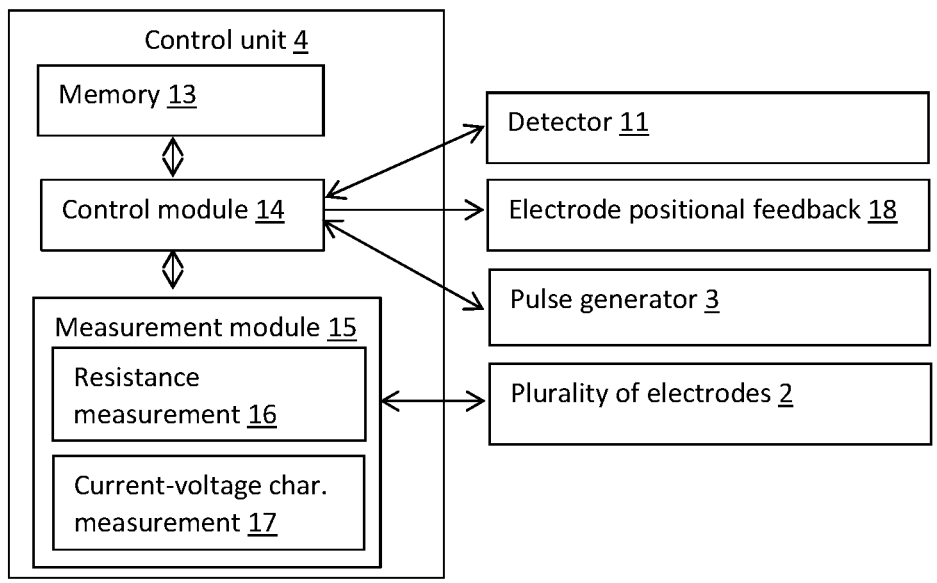
FIG. 3 is a block diagram depicting an embodiment of a control unit.

As depicted in FIG. 3 the control unit 4 may comprise a control module 14 and a measurement module 15. Preferably the control unit 4 further comprises a memory module 13. Preferably the control module 14 is adapted to store and read data from the memory module 13. The measurement module 15 may comprise a resistance measurement module 16 and/or current-voltage characteristic measurement module 17. The control module 14 and measurement module 15 may be electrically connected so that the control module 14 can read and interpret data provided by the measurement module 15. The control module 14 may control the measurements carried out by the measurement module 15. The control module 14 of the control unit 4 may be configured to periodically measure the resistance and/or the current-voltage characteristic. The control module 14 of the control unit 4 may be also configured to take individual measurements only or in combination with the periodical measurements of the resistance and/or the current-voltage characteristic.

The control module 14 may store the data measured by the measurement module 15 in the memory module 13. The control module 14 may further process and/or interpret the measured data before storing them. The control module 14 may be further configured to store and read a patient related data to the memory module 13 and may be further configured to match the patient's data with the measured data and vice versa. The control module 14 may be further configured to store to the memory module 13 and read from the memory module the apparatus' 1 settings data related to a specific patient 28. The settings data of the apparatus 1 may be measurement and/or generated pulse settings. The control module 14 may be further configured to match the patient's data with the measured data and vice versa. The control module 14 may be further configured to further match the apparatus' settings data with the patient's data and the measured data.

The measurement module 15 may be connected to the plurality of electrodes 2, 2a. Preferably the measurement module may be connected to each of the plurality of electrodes 2, 2a. The connection between the measurement module and the plurality of electrodes 2, 2a or each of the plurality of electrodes 2, 2a may be a wired connection for instance via a cable or a wireless connection. The measurement module 15 may be configured to measure resistance and/or current voltage characteristics between the plurality of electrodes 2, 2a. Preferably the measurement module 15 is configured to measure resistance and/or current voltage characteristics between selected electrodes amongst the plurality of electrodes 2, 2a. The measurement module 15 may be configured to take the measurements periodically or individually on demand. The control module 14 may control settings of the measurements such as its periodicity, sampling rate, resolution and/or type of measurements being resistance and/or current voltage characteristic.

As mentioned before the control unit 4 may be adapted to control a shape of electric pulses generated by the pulse generator unit 3 based on the measured resistance and/or current-voltage characteristic. Therefore, the control unit 4 may be connected to the pulse generator 3 to control the generated pulses. The control unit 4 may be connected to the pulse generator 3 via the control module 14 to control the generated pulses. The connection between the control unit 4 or the control module 14 and the pulse generator 3 may be a wired connection for instance via a cable or a wireless connection. The control module 14 of the control unit 4 or the control unit 4 by itself may control the pulses based on the measured data gained from the measurement module 15 and/or based on the data stored in the memory module 13.

Figure 11:
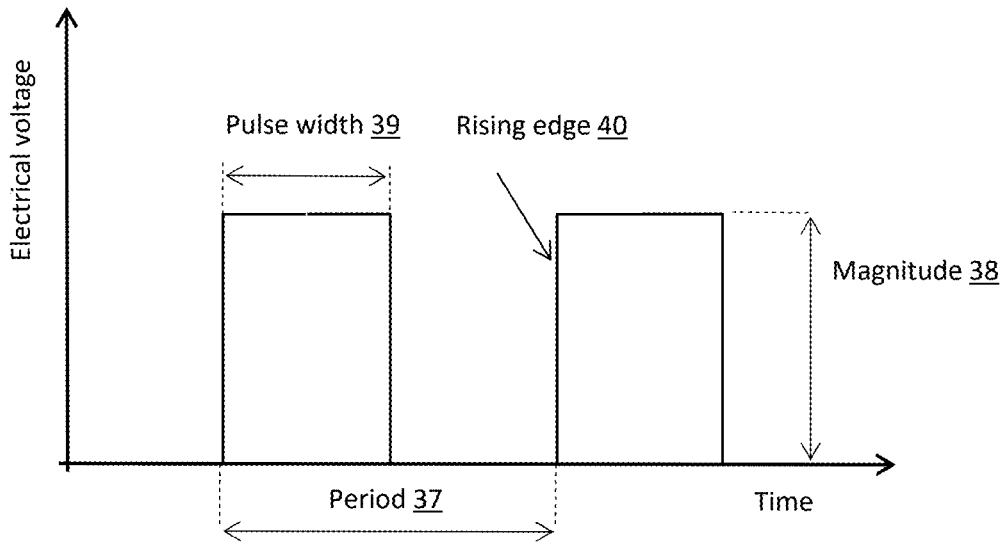
FIG. 11 is an exemplary illustration of an electrical pulse variables.

FIG. 11 provides an exemplary illustration of electrical pulse variables that can be controlled by the control module 14 thereby controlled by the control unit 4 or directly controlled by the pulse generator 3. The control unit 4 or the control module 14 or the pulse generator 3 may be configured to control a slope of rising edge 40 and/or a magnitude 38 of the pulses generated by the pulse generator 3. Preferably, the control unit 4 or the pulse generator 3 may be also configured to control a pulse period 37 and/or a pulse width 39 of the electrical pulses generated by the pulse generator 3. Advantageously, the control unit 4 may be configured to dynamically control an internal resistance of the pulse generator 3 based on periodical or individual measurements of the resistance and/or the current-voltage characteristic between the plurality of electrodes 2, 2a or between at least two of the plurality of electrodes 2, 2a.

As depicted in FIG. 3 the control unit 4 may further provide an electrode positional feedback 18. The electrode positional feedback 18 and consequently the control unit 4 may be configured to provide a feedback for an electrode positional guidance towards a predetermined nerve as at least one electrode 2a is being moved or re-positioned on the patient skin. The feedback may be based on changes of resistance and/or current-voltage characteristic between at least two electrodes of the plurality of electrodes 2, 2a. The feedback may be based on changes of resistance and/or current-voltage characteristic between at least one active electrode 21, 22 and one grounding electrode of the plurality of electrodes 2, 2a. The feedback may be provided as at least one of a sound, a picture or sequence of pictures, or a physiological response. Sound feedback may be provided as an audible signal means having variable intensity and/or frequency to provide the guidance when position the electrode towards the predetermined nerve. Pictorial or a sequence of pictures feedback may be provided by visual signal means. The visual signal means may be provided via a display and/or a signs. The physiological response feedback may be for instance provided via vibrational feedback having variable intensity/amplitude and/or frequency. Such vibrations may be transmitted to the skin of the patient. The vibrations may be transmitted to the skin of the patient directly by the electrode being moved or re-positioned. The vibrations may be induced by a vibration means coupled to or integrated within the electrode.

The neuromodulation apparatus 1 may further comprise at least one detector 11 configured to detect a response of the patient's body to at least one pulse generated by the pulse generator 3. The detector 11 as depicted on FIG. 4 may be further adapted to provide feedback on the detected response to the control unit 4. The at least one detector 11 may be configured to detect a change in an electrical activity produced by muscles as a response to the at least one pulse generated by the pulse generator 3. Such muscle electrical activity detector 19 may be an electromyography based (EMG) detector 20.

The at least one detector 11 may be at least one motion detector 24 as depicted in FIG. 4. The at least one motion detector 24 may be configured to detect a movement of the patient and adapted to provide feedback of the movement to the control unit 3. The movement of the patient 28 may be in response to the at least one pulse of the pulse generator 3. The at least one motion detector 24 may be at least one of an accelerometer 25, an electrical field sensor 26 or a camera 27. Preferably as depicted on FIG. 6 when using the accelerometer 25 as the motion detector then at least one accelerometer 25 may be attached to at least one foot of the patient's legs. Optionally, as depicted on FIG. 5 when using the camera 27 as the motion detector 24 then the camera is located in proximity of the detected motion being oriented so to detect the motion. Optionally, an electrical field sensor 26 can be used as a motion detector 24. The electrical field sensor 26 may use an electrical field change to detect a movement. An example of such electrical field sensor may be a three-dimensional gesture recognition and tracking controller chip, which uses an electric field to provide gesture information as well as positional data of the human limb in real time. Advantageously, combination of motion detectors selected from one or more of a camera 27, an accelerometer 25 and electrical field 26 sensor may be used. This may lead to an improvement of sensed movement accuracy and also provide redundancy of detection.

When the neuromodulation apparatus includes the at least one detector 11 then the control unit may further comprise a detector feedback module that interact with the at least one detector 11. The detector feedback module may be configured to provide a feedback from at least one detector 11 to the control unit module 14 and the control unit 4 respectively.

Figure 5:
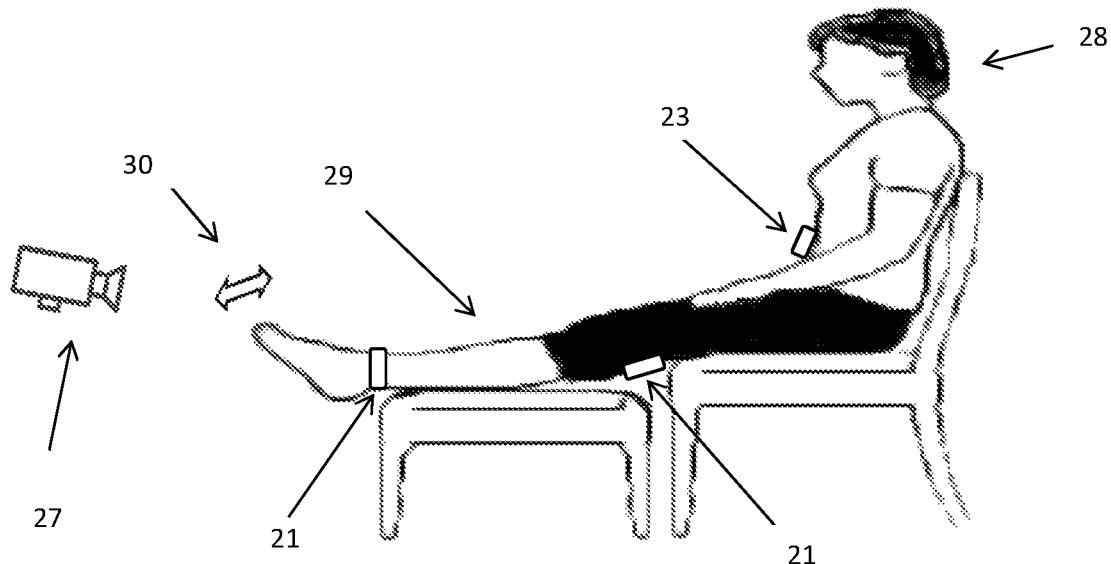
FIG. 5 is an exemplary illustration of electrodes placement on a patient with a camera as a motion detector.
Figure 6:
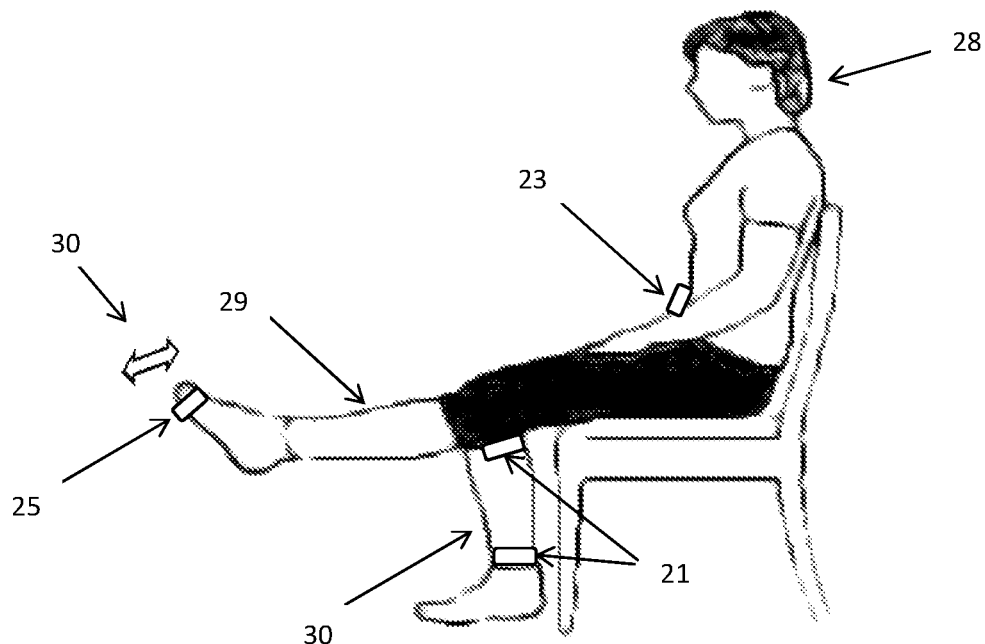
FIG. 6 is an exemplary illustration electrodes placement on a patient with an accelerometer as a motion detector.

FIGS. 5 and 6 provide exemplary illustrations of electrodes placement on a patient 28 where at least one of the plurality of electrodes 2, 2a may be applicable to a limb 29 of the patient 28 and detected movement of the patient may be a movement 30 of the limb. Preferably, the at least one of the plurality of electrodes 2, 2a further comprise a grounding electrode 23 applicable to a skin of the patient. The grounding electrode 23 may be applicable to an abdomen of the patient 28. Alternatively the grounding electrode 23 may be applicable elsewhere such as at a hip or a waste or an ankle of the patient 28. The motion detector 24 may be camera 27 or an electrical field sensor 26. The motion detector may detect a movement 30 of the limb 29. The movement of the limb may be in response to the at least one pulse of the pulse generator being delivered to the at least one of the plurality of electrodes. Preferably, the at least of the plurality electrodes 2, 2a may be a first and second active electrode 21, 22 as depicted in FIGS. 4 and 7. The first electrode 21 may be applicable to a back of a knee of a first leg 29 of the patient 28 and the second electrode 22 may be applicable to a back of a knee of a second leg 30 of the patient. The first electrode 21 may be applicable to a first leg 29 in proximity of an ankle of the first leg 29 of the patient 28. The second electrode 22 may be applicable to a second leg 30 of the patient 28 in a proximity of an ankle of the second leg 30 of the patient 28. As also depicted on FIG. 5 or 6 the first electrode 21 and/or the second 22 electrode may be placed in the proximity of a peroneal nerve located above the ankle.

FIG. 7 depicts an exemplary illustration of placement of the plurality of electrodes 2, 2a on both of patient legs 30 and 29. A first active electrode 21 of the plurality of electrodes 2, 2a may be applied to a back of a knee of a first leg 29 of the patient 28 and the second active electrode 22 of the plurality of electrodes 2, 2a may be applied to a back of a knee of a second leg 30 of the patient 28. Each of the legs 28, 29 may have attached one of motion detectors 24 that may be an accelerometer 25. Each of the accelerometers 25 may be attached to a foot of one of the legs 29, 30. Preferably, each of the accelerometers 24 may be attached to its respective foot in the area of tip of the foot. The arrows depicted on FIG. 7 associated with the active electrodes 21 and 22 indicate possible movement of the each of the active electrodes 21, 22 on the patient skin when positioning each of the active electrodes to the target nerve.

Another alternative arrangement of the electrodes is depicted in FIG. 8 where the at least one of the plurality of electrodes 2, 2a may be applicable to a throat 31 or a face of the patient 28 and the detected movement of the patient may be a movement of at least one face muscle of the patient 28. The at least one of the plurality of electrodes 2, 2a that may be applicable to a throat 31 or a face, may be at least one active electrode 21, 22. The movement may be detected by a camera 37 as depicted or the electrical field sensor used as the motion detector. Not shown grounding electrode may be applied to the head, chin or throat as well.

Figure 12:
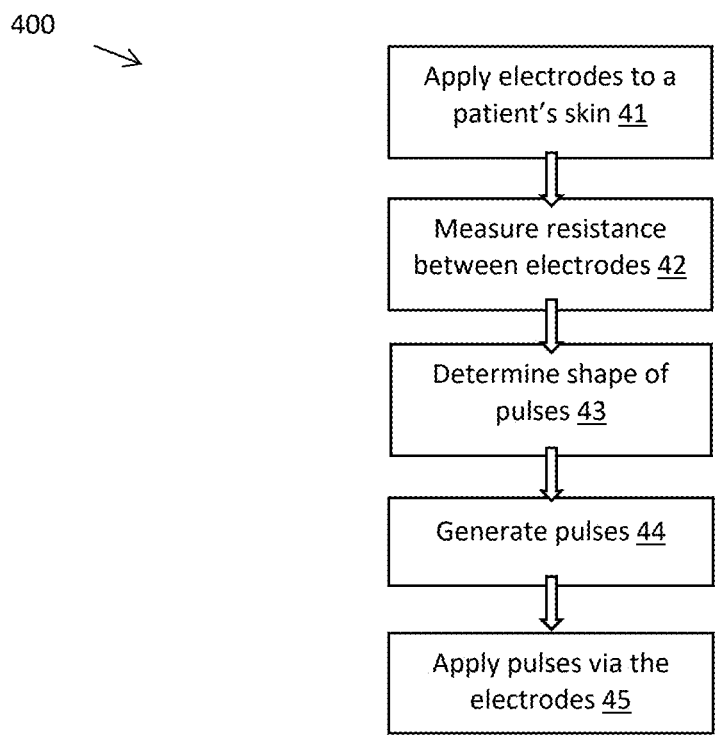
FIG. 12 is a flow diagram depicting an embodiment of a method of using the neuromodulation apparatus

Referring to FIG. 12, an exemplary flow diagram illustrates an embodiment 400 of a method for a neuromodulation apparatus 1. The method 400 may comprise step of applying 41 plurality of electrodes 2, 2a to a skin of a patient 28. The plurality of electrodes 2, 2a may comprise at least one active electrode 21, 22 and at least one ground electrode 23. The at least one electrode active electrode 21, 22 may be positioned in the probable location of a target nerve to be modulated. An example of such positioning is depicted in FIG. 7. The probable location of a target nerve may be a back of the knee, a throat or any other suitable location for neuromodulation in the proximity of a target nerve for neuromodulation. In next step 42 a resistance measurement between the plurality of electrodes 2, 2a is carried out. Preferably the resistance measurement is carried out between the at least one active electrode 21, 22 positioned in the probable location of a target nerve to be modulated and the at least one ground electrode. The resistance measurement may be performed amongst all, some or at least two of the active electrodes. The resistance measurement may be performed between at least two of the active electrodes 21, 22 and ground electrode 23. The at least one active electrode 21, 22 and/or ground electrode 23 may be a single electrode 2a or a matrix of electrodes 2.

Based on the measurement result in next step 43 shape of electrical pulses may be determined. The measurement result may determine at least one of magnitude 38, pulse width 39, period 37 and/or raising/falling edge of the pulse to be generated by the pulse generator 3.

Next steps may include generating 44 the pulses by the pulse generator. The pulses may have the determined shape from the previous step. In the next step 45 the pulses may be applied via the plurality of electrodes 2, 2a to the skin of the patient 28.

One benefit of the method may be that the measurement of the resistance or current-voltage characteristic between at least one of the active electrodes 21, 22 and at least one ground electrode 23 enables to set an optimal shape of the pulses generated by the pulse generator individually for each patient. Additional benefit may be that by taking the measurement of the resistance or current-voltage characteristic between the at least one of the active electrodes 21, 22 and at least one ground electrode 23 may provide a verification that the at least one of the active electrodes 21, 22 and at least one ground electrode 23 or each of the electrode of the plurality of electrodes 2, 2a is properly attached to the skin of the patient 28. In case an electrode is not attached properly to the skin of the patient the resistance measurement between the electrode and another electrode would show a change in the measured value. The change may be an increased resistance. Another benefit may be that the measurement of the resistance or current-voltage characteristic between at least one of the active electrodes 21, 22 and at least one of ground electrode 23 can be used for a self-check of operation of the neuromodulation apparatus 1. Such self-check may be achieved when plurality of subsequent measurements are taken and their results compared. For that periodical measurements of the resistance or current-voltage characteristic may be taken. Alternatively single non-periodical measurements of the resistance or current-voltage characteristic may be taken and used for self-check during the operation of the neuromodulation apparatus 1. For instance taking initial measurement and then a non-periodical or ad-hoc measurements at discrete intervals. Periodical, non-periodical or ad-hoc measurement of the resistance or current-voltage characteristic may be combined to achieve improved self-check functionality of the neuromodulation apparatus 1.

Figure 13:
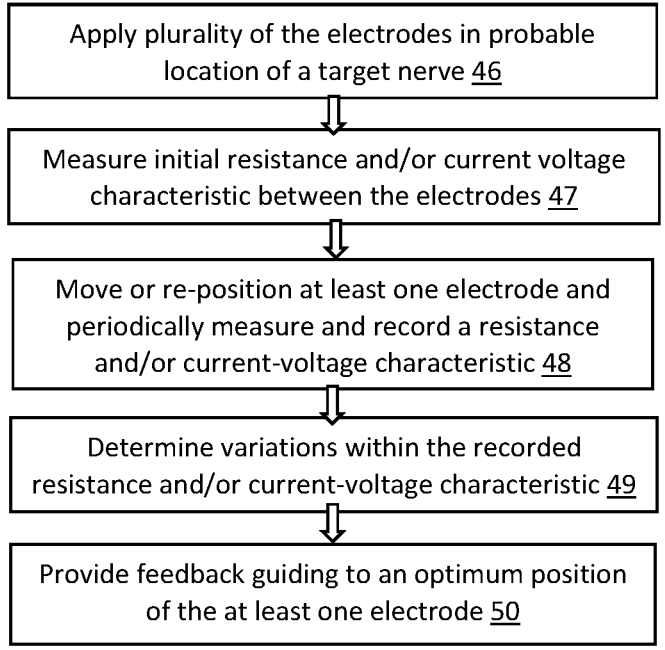
FIG. 13 is a flow diagram depicting an embodiment of a method of positioning electrode.

In FIG. 13, an exemplary flow diagram illustrates another embodiment 500 of a method for neuromodulation apparatus 1. The method 500 may be used in conjunction with, or as part of, the method 400 of FIG. 12. The method 500 may comprise step of applying 46 plurality of electrodes 2, 2a to a skin of a patient 28 in probable location of a target nerve to be modulated. The plurality of electrodes 2, 2a may comprise at least one active electrode 21, 22 and at least one ground electrode 23. The at least one active electrode 21, 22 may be positioned in the probable location of a target nerve to be modulated. An example of such positioning is depicted in FIG. 7. The probable location of a target nerve may be back of the knee, throat or any other suitable location for neuromodulation in the proximity of a target nerve for neuromodulation. In next step 47 a resistance measurement and/or a current voltage characteristic is measured between the plurality of electrodes 2, 2a. Preferably the resistance measurement and/or the current voltage characteristic is measured is performed between the at least one active electrode positioned in the probable location of a target nerve to be modulated and the at least one ground electrode.

The resistance measurement and/or the current voltage characteristic may be measured amongst all, some or at least two of the active electrodes and/or at least one ground electrode. The resistance measurement and/or the current voltage characteristic may be measured between at least two of the active electrodes and ground electrode. The at least one active electrode 21, 22 and/or ground electrode may be a single electrode 2a or a matrix of electrodes 2.

In next step 48 the at least one electrode of the plurality of electrodes 2, 2a may be applied to the skin of the patient 28 and may be moved or re-positioned whilst periodic measurements are taken and recorded. The measurements may be the resistance and/or current-voltage characteristic between the at least one electrode being moved or re-positioned and at least one another electrode of the plurality of electrodes 2, 2a. Preferably the measurements are being carried out between the active electrode 21, 22 and the ground electrode 23. A on limiting example of moving active electrode in the proximity of a target nerve is depicted by arrows associated with active electrodes 21 and 22 in FIG. 7.

In next step 49 a variation within the recorded resistance and/or current voltage characteristic may be determined and a feedback guiding 50 to an optimum position of the at least one electrode is provided.

One benefit of the method may be that the measurement of the resistance and/or current voltage characteristic enables to locate the correct position of the electrode towards the nerve to be modulated, therefore enables effective modulation of the nerve.

Figure 14:
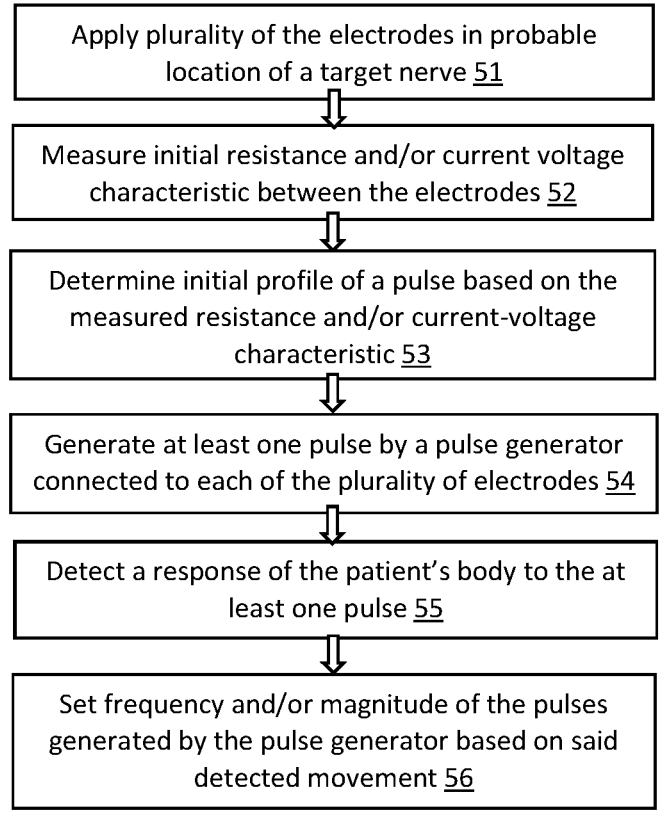
FIG. 14 is a flow diagram depicting an embodiment of a method of determining pulse shape

In FIG. 14, an exemplary flow diagram illustrates another embodiment 600 of a method for neuromodulation apparatus 1. The method 600 may be used in conjunction with, or as part of, the methods 400 and/or 500 of FIGS. 12 and 13. The method 600 may comprise a step 51 of applying the plurality of electrodes 2, 2a to a skin of a patient 28 in a probable location of a target nerve to be modulated. The plurality of electrodes 2, 2a may comprise at least one active electrode 21, 22 and at least one ground electrode 23. The at least one active electrode 21, 22 may be positioned in the probable location of a target nerve to be modulated. An example of such positioning is depicted in FIG. 7. The probable location of a target nerve may be back of the knee, throat or any other suitable location for neuromodulation in the proximity of a target nerve for neuromodulation. In next step 52 a resistance measurement and/or a current voltage characteristic may be measured between the plurality of electrodes 2, 2a. Preferably the resistance measurement and/or the current voltage characteristic is measured is performed between the at least one active electrode 21, 22 positioned in the probable location of a target nerve to be modulated and the at least one ground electrode 23. The resistance measurement and/or the current voltage characteristic may be measured amongst all, some or at least two of the active electrodes 21, 22 and/or at least one ground electrode 23. The resistance measurement and/or the current voltage characteristic may be measured between at least two of the active electrodes 21, 22 and the ground electrode 23. The at least one active electrode 21, 22 and/or the ground electrode 23 may be a single electrode 2a or a matrix of electrodes 2a. In next step 53 based on the measurement result an initial shape of electrical pulses may be determined. The measurement result may determine at least one of magnitude 38, pulse width 39, period 37 and/or raising/falling edge of the pulse to be generated by the pulse generator 3. Next steps may include generating 54 at least one pulse by the pulse generator. The at least one pulse may have the initial shape determined in the previous step. The generated at least one pulse may cause a response of the patient's body which may be a movement of the patient 28 in response to the at least one electrical pulse or the response of the patient's body may be a change in an electrical activity produced by muscles. The movement may be a reflexive movement. In case the at least one electrode active electrode 21 is positioned under the knee of a leg the movement may be a movement 30 of the very leg 29 as depicted in FIGS. 5 and 6.

The movement may be detected in step 55 by at least one detector 11 that may be configured to detect a movement of the patient and adapted to provide feedback of the movement to the control unit 4. The at least one detector 11 may be configured to detect a change in an electrical activity produced by muscles and adapted to provide feedback of the change to the control unit 4.

Preferably as depicted on FIG. 6 when using the accelerometer as the motion detector then at least one accelerometer 25 may be attached to at least one foot of the patient's legs 29, 30. Alternatively, as depicted on FIG. 5 when using the camera 27 as the motion detector 24 then the camera 27 is located in proximity of the detected motion being oriented so to detect the motion. Alternatively, an electrical field sensor 26 can be used as a motion detector 24. The electrical field sensor 26 may use an electrical field change to detect a movement.

In next step 56, based on the detected response of the patient's body, the initial shape of the at least one pulse generated by the pulse generator 3 may be adjusted. The detected response of the patient's body may be used to provide a continuous or periodical feedback for adjustment of shape and frequency of the generated pulses during the neuromodulation. Optionally the detected movement may be used only to adjust the initially set frequency and shape of the at least one pulse.

One benefit of the method may be that the shape and frequency of the pulses generated by the pulse generator is optimized either only at the beginning or during neuromodulation, therefore providing more effective and safer neuromodulation.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A neuromodulation apparatus comprising:
   a plurality of electrodes, each electrode of the plurality of electrodes having an electrically conductive element configure to be applied to a skin of a patient;
   a pulse generator electrically connected to each electrode of the plurality of electrodes for transmitting electric pulses to the plurality of electrodes; and
   a control unit coupled to the pulse generator and adapted to periodically measure a resistance and/or a current-voltage characteristic between at least two electrodes of the plurality of electrodes, wherein the control unit is adapted to control a shape of the electric pulses based on the measured resistance and/or current-voltage characteristic, wherein the control unit is configured to dynamically control an internal resistance of the pulse generator based on the periodical measurement of the resistance and/or the current-voltage characteristic.

2. The neuromodulation apparatus according to claim 1, further comprising at least one detector configured to detect a response of the patient's body to at least one pulse generated by the pulse generator, wherein the detector is further adapted to provide feedback on the detected response to the control unit.

3. The neuromodulation apparatus according to claim 2, wherein the at least one detector is at least one motion detector configured to detect a movement of the patient's body and adapted to provide feedback on the movement to the control unit, wherein the movement of the patient's body is in response to the at least one pulse of the pulse generator.

4. The apparatus according to claim 3, wherein the at least one motion detector includes at least one of an accelerometer, an electrical field sensor or a camera.

5. The neuromodulation apparatus according to claim 1, wherein at least one of the plurality of electrodes is applicable to a proximity of at least one peripheral nerve of the patient's body.

6. The apparatus according to claim 1, wherein the control unit is configured to provide feedback for an electrode positional guidance towards a predetermined nerve as at least one electrode is being moved or repositioned on the patient skin, wherein the feedback provided is based on changes of resistance and/or current-voltage characteristic between at least two electrodes of the plurality of electrode.

7. The apparatus according to claim 1, wherein the control unit is configured to control a slope of rising edge of the electric pulses and/or a magnitude of the electric pulses.

8. The apparatus according to claim 1, wherein the control unit is further configured to control a pulse period and/or a pulse width of the electric pulses.

9. The apparatus according to claim 1, wherein the plurality of electrodes is formed by at least one matrix of electrodes comprising a plurality of electrically conductive elements electrically isolated from each other, wherein each of the electrically conductive elements is applicable to the skin of the patient.

10. A method of using the neuromodulation apparatus according to any one of the preceding claims, comprising:
    applying the plurality of the electrodes to a skin of a patient, wherein at least one electrode of the plurality of the electrodes is positioned in the probable location of a target nerve to be modulated;
    initiating a calibration mode and calibrating an initial position by a measurement of a resistance and/or a current-voltage characteristic between the plurality of electrodes;
    moving or repositioning the at least one electrode of the plurality of electrodes applied to the skin of the patient whilst periodically measuring and recording a resistance and/or current-voltage characteristic between the plurality of electrodes; and
    determining variations within the recorded resistance and/or current-voltage characteristic.

11. The method of claim 10 further comprising:
    providing feedback guiding to an optimum position between the at least one of the plurality of electrodes and the target nerve to be modulated based on the variations.

12. The method of claim 10 further comprising:
    determining an initial profile of a pulse for neuromodulation based on the measured resistance and/or current-voltage characteristic.

13. The method of claim 10 further comprising:
    generating at least one pulse by a pulse generator connected to each of the plurality of electrodes; and
    detecting a response of the patient's body to the at least one pulse generated by the pulse generator; and
    setting frequency and/or magnitude of the electric pulses.

* * * * *